May 19, 1959 R. LEE, JR 2,887,362
MANUFACTURE OF PHOSPHORIC ACID
Filed Dec. 30, 1955
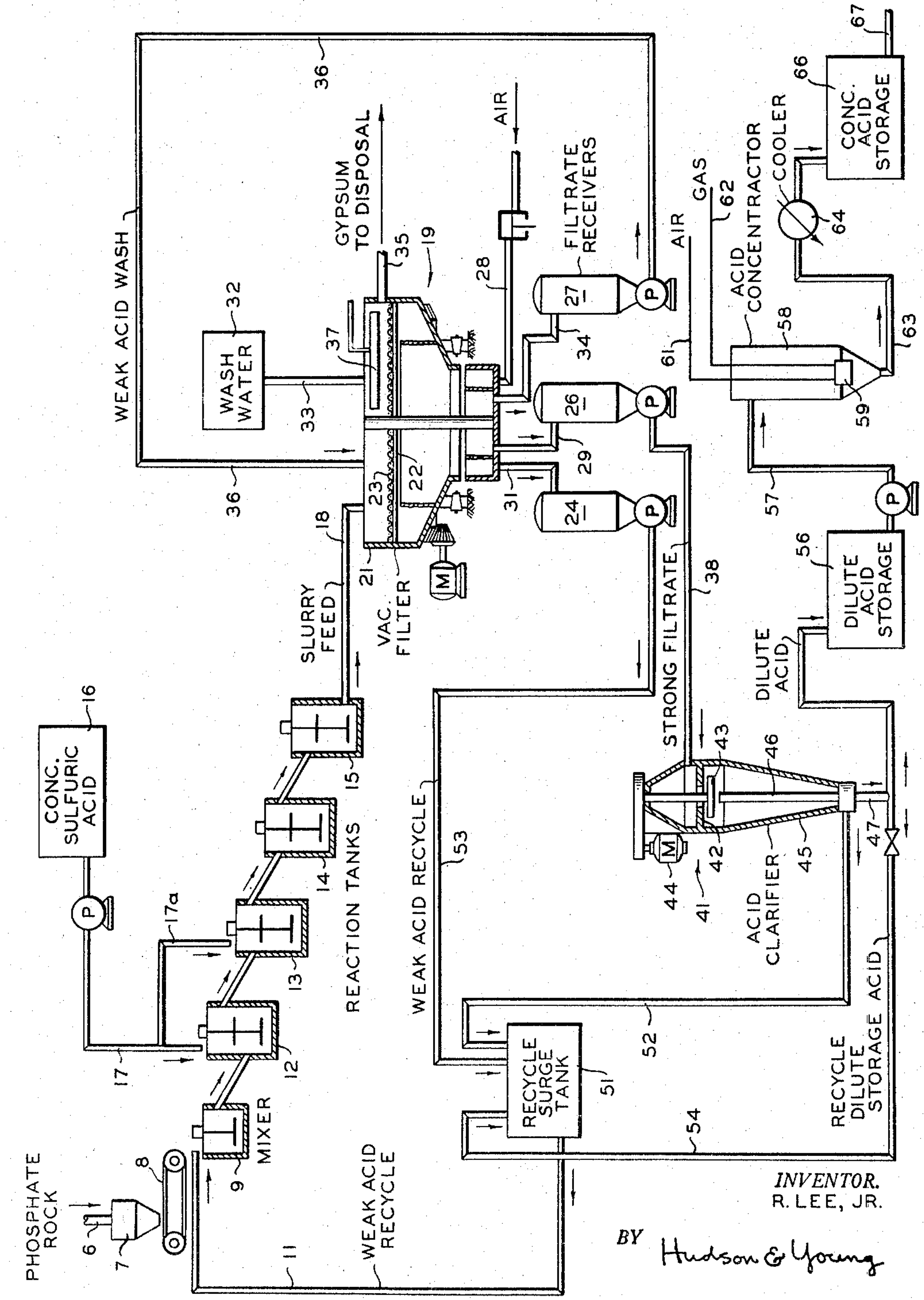
INVENTOR.
R. LEE, JR.
BY Hudson & Young
ATTORNEYS United States Patent Office
2,887,362
Patented May 19, 1959

1

2,887,362

MANUFACTURE OF PHOSPHORIC ACID

Roy Lee, Jr., Houston, Tex., assignor to Phillips Petroleum Company, a corporation of Delaware Application December 30, 1955, Serial No. 556,666

5 Claims. (Cl. 23—165)

This invention relates to the manufacture of phosphoric acid. More particularly, it relates to process and apparatus for the clarification of phosphoric acid produced by reacting phosphate rock and other similar phosphatic material with acidic materials.

Many processes have been suggested, patented, or employed in the past for the manufacture of phosphoric acid. The so-called wet process for producing phosphoric acid has been extensively used because of its simplicity and economic operation. Phosphate is treated according to this process with sulfuric acid to produce a slurry of soluble phosphoric acid and insoluble calcium sulphate (gypsum). The slurry is then filtered and the resulting phosphoric acid filtrate may then be concentrated for the production of triple superphosphate or other phosphatic fertilizer material. The insoluble calcium sulphate is usually reslurried with water and pumped to a spoil pond for disposal.

The production of phosphoric acid by the wet process has been found to be limited by the filterability of the insoluble calcium sulphate. Although by increasing the average calcium sulphate particle size in the filter feed, the amount of insoluble calcium sulphate passing through the filter cloth with filtrate can be reduced, it cannot be completely eliminated. Also, since calcium sulphate is slightly soluble in phosphoric acid, as the dilute acid is cooled in dilute acid storage and concentrated before processing, or when there is a change in sulphate concentration, some calcium sulphate and other solids are precipitated throughout the system. Periodically these solids which precipitate and settle out in the storage tanks are removed, usually by slowly withdrawing the acid and flushing the settlings to the sewer. Storage tank cleaning can be eliminated by the provision of agitators in the storage tank, but, of course, this does not eliminate the necessity of providing some means for removal of the insoluble calcium sulphate and other inerts.

The desirability of removing insoluble calcium sulphate and other inerts from the phosphoric acid product is especially important when the phosphoric acid is used in making fertilizer materials such as triple superphosphate. In the production of triple superphosphate from phosphate rock and phosphoric acid it often becomes necessary to increase the ratio of phosphoric acid to the finished triple superphosphate product due to the presence of these insoluble materials. A sticky triple superphosphate product often produced in the manufacture of triple superphosphate is believed directly attributed to the slight increase in acid found necessary in order to prevent a decrease in the available phosphoric acid anhydride ($P_2O_5$) of the product.

Removal of the insoluble calcium sulphate and other inerts from the dilute phosphoric acid by flushing the storage tanks results in a sizeable amount of $P_2O_5$ being carried to disposal. In order to economically produce phosphoric acid these losses of $P_2O_5$ are prohibitive and thus there has arisen a need for an efficient method and apparatus for the removal of calcium sulphate and other inerts without unnecessarily incurring losses of available $P_2O_5$.

2

Accordingly, an object of this invention is to improve the efficiency of operation and equipment used in the manufacture of phosphoric acid.

Another object is to produce phosphoric acid free from contaminants.

A further object is to simplify the problems of purification and concentration involved in the production of phosphoric acid.

A still further object is to provide improved process and apparatus for the production of a phosphoric acid product suitable for use in the manufacture of fertilizer materials such as triple superphosphate having a high content of available $P_2O_5$.

Other objects, advantages, and features will become apparent to those skilled in the art from the accompanying specification, drawing, and appended claims.

The principal chemical reaction occurring in phosphoric acid manufacture is that between phosphate rock and sulfuric acid. This reaction is indicated by the following equation:

$$Ca_3(PO_4)_2+3H_2SO_4=3CaSO_4+2H_3PO_4$$

The reaction can be better understood by visualizing it in two separate steps:

$$Ca_3(PO_4)_2+4H_3PO_4+\text{"X"}H_3PO_4=3CaH_4(PO_4)_2+\text{"X"}H_3PO_4$$

$$3CaH_4(PO_4)_2+3H_2SO_4=3CaSO_4+6H_3PO_4$$

The reaction is carried out in a dilute slurry phase with a small excess of sulfuric acid under controlled conditions of concentration and temperature. The reaction is relatively slow and requires approximately two hours for completion. Heat is released to the extent of 450 B.t.u. per pound of $P_2O_5$ reacted. Separation of the reaction products is accomplished by a washing-filtration operation with discard of the gypsum filter cake. From a practical standpoint sulfuric acid is the only inorganic acid commercially considered applicable to the manufacture by the so-called wet process. The sulfuric acid employed may be derived from either the lead chamber or the contact type of plant. The strength is not material except the stronger the acid the more concentrated is the phosphoric acid product therefrom, hence when readily available, 66° Bé. acid is to be preferred, especially since this is diluted with dilute phosphoric acid washed from the filter cake during the filtration operation.

By convention, the phosphorus content of any type of phosphoric fertilizer is expressed as phosphoric acid anhydride ($P_2O_5$). Most commonly, the term phosphoric acid is used to denote the $P_2O_5$ content. The difference between the total $P_2O_5$ content of a fertilizer and the fraction that is insoluble in ammonium citrate solution is the portion caused to be available to use of the plant and hence is named available $P_2O_5$ or available phosphoric acid. In the fertilizer trade, it has long been the custom to express the quantity of phosphate rock in terms of tricalcium phosphate, since tricalcium phosphate is seldom, if ever, found in phosphate rock as such.

Of considerable importance are the side reactions involving fluorine, present initially in the rock as calcium fluoride or in a combined form as fluorapatite. There is established chemical and physical equilibria such that the fluorine appears in the fumes largely as silicon tetrafluoride and in the reaction liquid largely as hydrofluosilic acid and fluosilicates.

In order to facilitate the understanding of the present invention reference will now be made to the single figure which is a diagrammatic representation of a system for treating the raw materials to produce the desired product according to the present invention.

The phosphate rock required for the manufacture of phosphoric acid is transferred from a fine rock storage silo (not shown) by line 6, to a fine rock hopper 7. The phosphate rock is accurately weighed and conveyed from the fine rock hopper 7 by a fine rock feeder-conveyor belt 8 to a phosphoric acid-phosphate rock mixing tank 9 provided with agitation means. Before phosphate rock is acidulated with sulfuric acid, it is first premixed in mixing tank 9 with a weak recycled phosphoric solution supplied by line 11. Alternatively, a wetting trough can be employed in place of mixing tank 9 and the wetted mixture retained for only a few seconds. Mixing tank 9 may be suitably constructed of carbon steel lined with rubber. Here the fine rock is wetted by violent agitation with the recycle phosphoric acid stream and the resulting slurry allowed to overflow by gravity into the first of a series of four reaction tanks 12, 13, 14, and 15 provided with suitable agitation means. The reaction tanks are preferably enclosed and fabricated from carbon steel lined with rubber and acid proof brick.

The mixture of phosphate rock and phosphoric acid overflowing from the mixing tank 9 is mixed and partially reacted with sulfuric acid in the first reactor 12. The concentrated sulfuric acid is supplied from a concentrated acid storage tank 16 to the first reactor 12 by means of line 17. After the phosphate rock and sulfuric acid have been mixed and partially reacted in the first reactor 12, the mixture overflows into reaction tank 13 where additional sulfuric acid is added by line 17*a*. The rock slurry mixture overflows into reactor 14 and then to reactor 15. Reactors 13, 14, and 15 are in series with the first reactor 12 to provide sufficient retention time for the reaction to go to completion and form phosphoric acid and gypsum.

The reaction between sulfuric acid and phosphate rock is exothermic; therefore, considerable quantities of heat are liberated by the reaction and by the dilution of the sulfuric acid. If not removed, this heat has two undesirable effects: it increases the corrosive ability of the acid and causes the formation of solids that possesses poor filtration characteristics. The heat and fumes evolving from the reaction are carried away by suitable means (not shown) and some of the water in the acid is evaporated by passing air through the slurry and out the exhaust duct to fume scrubbers (not shown).

The phosphoric acid-gypsum slurry overflows from the last reactor 15 to a group of horizontal vacuum filters by line 18. For purposes of illustration, only one horizontal vacuum filter is shown and is generally designated 19. The horizontal vacuum filter 19 is the Oliver type, and it should be understood that I do not intend to limit the practice of my invention to any particular type of vacuum filter.

The main body of filter 19, shown schematically in the drawing, consists of a large pan 21 mounted on a rotating turn-table (not shown). Filter supports 22 divide the filter into a plurality of sectors. A filter cloth 23 made of Saran, for example, is stretched tight and caulked in place forming a false bottom for the pan 21. Supports 22 serve as partitions to separate the space under the cloth 23 into four individual compartments, for example, each connected with its own outlet or inlet conduit. As the filter pan 21 rotates the filtrate media pass over the openings to conduits leading to three filtrate receivers 24, 26, and 27 and the one section of the pan 21 passes over the inlet of a conduit 28 supplying compressed air; thus, during one revolution each section of the pan 21 is connected to each of these four conduits during a part of the pan revolution.

A vacuum pump (not shown) connected to the tops of the filtrate receivers 24, 26 and 27, through suitable moisture and filtrate traps, pulls a vacuum on the receivers and the compartments under the filtrate cloth 23.

To describe the operation of the filter 19, one of the sectors of the pan 21 will be traced through one revolution.

At the beginning of the revolution the pan sector passes under the phosphoric acid-gypsum slurry feed distributor line 18 where the feed is fed over the surface of the filter cloth 23. Compressed air supplied by line 28 is blown through the filter cloth 23 from its underside while the feed is supplied to the topside thereof. This passage of compressed air through the weave of the filter cloth 23 loosens the deposit of calcium sulphate deposited thereon. The filtrate medium, known as the storage or No. 1 filtrate, passing through the filter cloth 23 into the compartment underneath then passes through a drain outlet and is conducted by line 29 to a first filtrate receiver 26. The vacuum under the cloth 23 draws the phosphoric acid filtrate through the cloth weave leaving a cake of gypsum on the cloth surface.

It is impossible to drain all the acid off the gypsum crystals in this manner, therefore, two stages of cake washing are used. This insures a desired phosphoric acid recovery. After each sector passes the opening to the first filtrate receiver 26, it comes in contact with the opening to the second filtrate receiver 24. A weak acid, known as weak wash filtrate is sprayed over the cake displacing the storage acid previously retained by the cake. The resulting filtrate acid is drained through line 31 to the second filtrate receiver 24.

When the pan sector passes the opening to the second filtrate receiver 24 and comes in contact with the opening to the third filtrate receiver 27, the third filtration stage begins. Water supplied by tank 32 and line 33 is sprayed over the gypsum cake and dilutes the acid retained by the cake after the first washing stage. This acid is drained through line 34 to the third filtrate receiver 27 and pumped back to the filter 19 through line 36 where it is used for the first washing.

The pan sector then passes on to the fourth stage where the gypsum cake comes in contact with a rotating reel 37 which rakes off from the filter cloth 23 all except about the bottom ¼ inch of the gypsum cake. The removed cake passes into a launder 35, draining into the slurry sump. After being cleaned of the main portion of gypsum cake, the pan sector passes under the feed distributor line 18 and the cycle is repeated.

Since the filtration of the gypsum is not complete for reasons set forth hereinbefore, the amount of gypsum and other fines material passing through the filter cloth 23 must be removed if the losses of available $P_2O_5$ are to be kept at a minimum or eliminated and if greater economical operation of the manufacturing process is to be obtained.

Thus, the storage filtrate, or dilute acid product, is continuously pumped by line 38 to a solution clarifier generally designated 41, such as an Oliver-type centriclone. The dilute acid from line 38 enters the feed inlet of the clarifier 41 and passes over the stationary entry plate 42 into an impeller 43 which revolves at high speeds by motor 44, said impeller 43 imparting the required circular velocity to the dilute acid solution. The centrifugal forces created cause the suspended gypsum and other fines material to be thrown to the outer radius of the conical retaining shell 45 where they spiral downward to the apex of the shell 45 and are removed by an outlet and discharged to line 52. The dilute storage acid having the fines material removed therefrom spirals upwards in the core and is drawn off at the center through the overflow riser pipe 46 and passes through an outlet at the bottom of pipe 46 to line 47.

The entrained fines material along with a small quantity of acid is pumped to a recycle surge tank 51 by line 52 from which it is recycled through line 11 to mixing tank 9 where the fine gypsum crystals function as seed or nuclei particles of the growth of large crystals. Into this tank 51 is also recycled by line 53 the weak wash filtrate from the second filtrate receiver 24; this acid, sometimes known as process liquor filtrate, is also recycled through line 11 to mixing tank 9 and is eventually used as makeup acid in the phosphate rock phosphoric acid reaction. A minimum operating level is maintained in tank 51 and normally the volume of the process liquor filtrate will be sufficient to provide the necessary makeup or process acid that must be recycled to the mixing tank 9. However, in the event this source is not sufficient, a branch line 54 from the product acid line 47 is also connected to the surge tank 51.

The clarified, dilute acid product supplied by line 47 is conducted to a dilute acid storage tank 56. This tank 56 is constructed of carbon steel and lined with rubber and acid proof brick. The strength of the dilute acid product is usually 32–33% and therefore must be concentrated to about 44–46% where such acid is subsequently used in the manufacture of fertilizer material such as triple superphosphate. Accordingly, the dilute phosphoric acid is pumped from storage tank 56 through line 57 to a concentrator generally designated 58 in which heating means 59 are submerged and to which air 61 and combustion gas 62 is supplied. Concentrated phosphoric acid is pumped from the concentrator 58 through line 63 and phosphoric acid cooling means 64 to the concentrated acid storage tank 66.

Although I have described and illustrated the removal of gypsum and other fines material in 41 from the storage phosphoric acid upstream of the dilute acid storage tank 56, it is to be understood that it is within the scope of my invention to accomplish this clarification, for example, downstream of the dilute acid storage tank 56 such as in line 57 or 63, downstream of the concentrated acid storage tank 66 such as in line 67, or in several parts of the system. In some installations it has been found preferable to locate 41 in line 57 as described above. Clarification of the acid product in these alternative parts of the system may be dictated by the several factors involved in handling the product streams, such as the precipitation of the gypsum fines upon cooling, etc., and the most efficient point in the system in which clarification can be effected will become apparent to those skilled in the art upon being acquainted with this invention.

The following is a material balance for the system described above, the components being given in tons per hour, and the various lines are indicated by the reference numerals appearing in the drawing.

*Material balance*

| Component | Rock to Mixer (8) | Sulfuric Acid to Reaction Tanks (17) | Recycle Phosphoric Acid to Mixer (11) | Slurry to Filters (18) | Storage Filtrate to centriclone (38) | Acid Product (47) | Surge Tank (54) | Fines Recycle to Surge Tank (52) | Weak Acid Filtrate to Surge Tank (53) | Filtrate Wash (36) | Filter Wash Water (33) | Filter Cake (35) |
|---|---|---|---|---|---|---|---|---|---|---|---|---|
| Liquid | | 16.39 | | 83.25 | | 22.2 | 43.8 | 5.7 | | | 29.02 | |
| Solids | 19.5 | | | 27.84 | | 0.2 | | 1.9 | | | | |
| Total | 19.5 | 16.39 | 81.56 | 111.09 | 71.35 | 22.4 | 43.8 | 7.6 | 32.43 | 31.93 | 29.02 | 36.33 |
| Specific Gravity | | 1.82 | 1.25 | 1.50 | 1.33 | 1.33 | 1.33 | 1.44 | 1.13 | 1.07 | 1.0 | |

In a typical phosphoric acid manufacturing process adapted to practice this invention by the clarification of the dilute acid product upstream of the dilute acid storage tank, as hereinbefore described and shown in the drawing, substantial reduction of the $P_2O_5$ losses, heretofore encountered, has been repeatedly demonstrated. The solids content in the dilute acid product has generally been reduced from 3.5 percent to less than 0.75 percent, and many analyses in the range of 0.3 and 0.4 percent solids have been obtained.

As many possible variations and modifications of this invention may be made by those skilled in the art without departing from the scope thereof, it is to be understood that all the material herein disclosed and the conditions and equipment set forth are merely illustrative and do not unduly limit my invention.

I claim:

1. In a method for production of phosphoric acid according to the wet process, comprising the steps of reacting in a reaction zone solid phosphatic material with sulfuric acid and dilute recycle phosphoric acid, maintaining with agitation the resulting reaction mixture in said reaction zone, passing all of said reaction mixture to a separation zone and there separating by filtration a liquid component comprising phosphoric acid containing a relatively dilute fines suspension of a small amount of calcium sulfate, and a coarse-solids slurry of a major amount of calcium sulfate, and recycling a portion of said phosphoric acid to said reaction zone, the improvement comprising passing said liquid component containing said suspension of calcium sulfate fines to a clarification zone and imparting to said liquid component a rotary flow along a spiral path thereby separating said fines suspension of calcium sulfate from said phosphoric acid prior to concentrating the latter, and recycling said fines suspension of calcium sulfate to said reaction zone.

2. A method for the production of phosphoric acid according to the wet process, which comprises the steps of supplying a mixing zone with comminuted phosphatic material and recycle phosphoric acid, passing the resulting mixture to a reaction zone where sulfuric acid is supplied thereto, maintaining with agitation the resulting reaction mixture in said reaction zone, passing all of said reaction mixture to a filtration zone and there separating a liquid component comprising phosphoric acid containing a dilute fines suspension of a small amount of calcium sulfate from a coarse-solids slurry of a major amount of calcium sulfate, passing said liquid component prior to its concentration to a clarification zone and there imparting to said liquid component containing said suspension of calcium sulfate fines a rotary flow along a spiral path thereby separating said phosphoric acid from said fines suspension of calcium sulfate, and recycling the latter to said mixing zone.

3. A method for the production of phosphoric acid according to the wet process, which comprises the steps of supplying a mixing zone with comminuted phosphatic material and recycle phosphoric acid, passing the resulting mixture to a reaction zone where sulfuric acid is supplied thereto, maintaining with agitation the resulting reaction mixture in said reaction zone, passing all of said reaction mixture to a filtration zone and there separating a liquid component comprising phosphoric acid containing a dilute fines suspension of a small amount of calcium sulfate from a coarse-solids slurry of a major amount of calcium sulfate, passing said liquid component prior to its concentration to a clarification zone and there imparting to said liquid component containing said suspension of calcium sulfate fines a rotary flow along a spiral path thereby separating said phosphoric acid from said fines suspension of calcium sulfate.

4. In a method for the production of concentrated phosphoric acid according to the wet process, comprising the steps of supplying a mixing zone with comminuted phosphatic material and recycle phosphoric acid, passing the resulting mixture to a reaction zone where sulfuric acid is supplied thereto, maintaining with agitation the resulting reaction mixture in said reaction zone, passing all of said reaction mixture to a filtration zone and there separating a liquid component comprising dilute phosphoric acid containing a dilute fines suspension of a small amount of calcium sulfate from a coarse-solids slurry of a major amount of calcium sulfate, passing said liquid component to a dilute acid storage zone, recycling a portion of said liquid component to said mixing zone, passing the remaining portion of said liquid component to concentration zone, and passing the resulting concentrated phosphoric acid product to a concentrated acid storage zone, the improvement comprising passing said liquid component containing said fines suspension of calcium sulfate to a clarification zone prior to concentrating said liquid component and there imparting to said liquid component containing said suspension of calcium sulfate fines a rotary flow along a spiral path, thereby removing said fines suspension of calcium sulfate from said liquid component, and recycling said fines suspension of calcium sulfate to said mixing zone.

5. The method of claim 4 wherein said removing of fines of calcium sulfate is accomplished in said clarification zone upstream of said dilute acid storage zone.

References Cited in the file of this patent

UNITED STATES PATENTS

| | | |
|---|---|---|
| 1,339,519 | Lasher | May 11, 1920 |
| 1,836,672 | Larsson | Dec. 15, 1931 |
| 1,836,694 | Wadsted | Dec. 15, 1931 |
| 1,894,514 | Hechenbleikner | Jan. 17, 1933 |
| 1,998,106 | Titlestad | Apr. 16, 1935 |
| 2,233,956 | Moore | Mar. 4, 1941 |
| 2,272,402 | Du Bois | Feb. 10, 1942 |
| 2,670,274 | Jones | Feb. 23, 1954 |
| 2,710,247 | Knowles et al. | June 7, 1955 |